United States Patent
Kauffmann et al.

(10) Patent No.: US 10,452,920 B2
(45) Date of Patent: Oct. 22, 2019

(54) SYSTEMS AND METHODS FOR GENERATING A SUMMARY STORYBOARD FROM A PLURALITY OF IMAGE FRAMES

(71) Applicant: Google LLC, Mountain View, CA (US)

(72) Inventors: Alejandro Kauffmann, San Francisco, CA (US); Andrew Dahley, San Francisco, CA (US); Phuong Le, Sunnyvale, CA (US); Mark Ferdinand Bowers, San Francisco, CA (US); Ignacio Garcia-Dorado, Mountain View, CA (US); Robin Debreuil, Mountain View, CA (US); William Lindmeier, San Francisco, CA (US); Brian Foster Allen, San Francisco, CA (US); Ashley Ma, San Francisco, CA (US); Pascal Tom Getreuer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/798,733

(22) Filed: Oct. 31, 2017

(65) Prior Publication Data

US 2019/0130192 A1 May 2, 2019

(51) Int. Cl.
*G06K 9/00* (2006.01)
*H04N 5/262* (2006.01)
(Continued)

(52) U.S. Cl.
CPC ..... *G06K 9/00751* (2013.01); *G06K 9/00765* (2013.01); *G11B 27/031* (2013.01);
(Continued)

(58) Field of Classification Search
CPC .......... G08B 13/1963; G08B 13/19632; G08B 15/001; H04N 5/2253; H04N 5/2256;
(Continued)

(56) References Cited

U.S. PATENT DOCUMENTS

| 2009/0013387 A1* | 1/2009 | Paas ........................ H04L 51/38 726/5 |
| 2009/0208118 A1* | 8/2009 | Csurka ............... G06K 9/00664 382/228 |

(Continued)

FOREIGN PATENT DOCUMENTS

| EP | 1906405 | 2/2008 |
| EP | 2916325 | 9/2015 |

OTHER PUBLICATIONS

Invitation to Pay Additional Fees for International Application No. PCT/US2018/041609 dated Nov. 5, 2018, 9 pages.
(Continued)

*Primary Examiner* — Huy T Nguyen
(74) *Attorney, Agent, or Firm* — Dority & Manning, P.A.

(57) ABSTRACT

The present disclosure provides systems and methods that generate a summary storyboard from a plurality of image frames. An example computer-implemented method can include inputting a plurality of image frames into a machine-learned model and receiving as an output of the machine-learned model, object data that describes the respective locations of a plurality of objects recognized in the plurality of image frames. The method can include generating a plurality of image crops that respectively include the plurality of objects and arranging two or more of the plurality of image crops to generate a storyboard.

19 Claims, 7 Drawing Sheets

(51) Int. Cl.
| H04N 5/14 | (2006.01) |
| G11B 27/036 | (2006.01) |
| G11B 27/031 | (2006.01) |
| G11B 27/28 | (2006.01) |
| G11B 27/34 | (2006.01) |

(52) U.S. Cl.
CPC ............ *G11B 27/036* (2013.01); *G11B 27/28* (2013.01); *G11B 27/34* (2013.01); *H04N 5/144* (2013.01); *H04N 5/147* (2013.01); *H04N 5/2628* (2013.01)

(58) Field of Classification Search
CPC ............ H04N 5/2257; H04N 5/23203; H04N 5/23206; H04N 7/183; E04H 12/182
See application file for complete search history.

(56) References Cited

U.S. PATENT DOCUMENTS

| 2010/0128986 | A1 | 5/2010 | Xu | |
| 2014/0328570 | A1* | 11/2014 | Cheng | G11B 27/10 386/241 |
| 2016/0070963 | A1* | 3/2016 | Chakraborty | G06K 9/6271 386/241 |
| 2016/0155011 | A1* | 6/2016 | Sulc | G06T 7/73 382/103 |

OTHER PUBLICATIONS

Aydin et al., "Automated Aesthetic Analysis of Photographic Images", Institute of Electrical and Electronic Engineers Transactions on Visualization and Computer Graphics, vol. 21, No. 1, Jan. 2015, 13 pages.
Barnes et al., "PatchTable: Efficient Patch Queries for Large Datasets and Applications", Association for Computing Machinery Transactions on Graphics, New York, New York, Aug. 2015, 10 pages.
Chu et al., "Optimized Comics-Based Storytelling for Temporal Image Sequences", Institute of Electrical and Electronic Engineers Transactions on Mulitmedia, vol. 17, No. 2, Jan. 2015, 14 pages.
Elad et al., "Style Transfer Via Texture Synthesis", Institute of Electrical and Electronic Engineers Transactions on Image Processing, vol. 26, No. 5, May 5, 2017, pp. 2338-2351.
Gatys et al., "Controlling Perceptual Factors in Neural Style Transfer", arXiv:1611.07865, May 11, 2017, 9 pages.
Gatys et al., "Image Style Transfer Using Convolutional Neural Networks", In Proceedings of the Institute of Electrical and Electronic Engineers Conference on Computer Vision and Pattern Recognition, Seattle, Washington, Jun. 27-30, 2016, pp. 2414-2423.
Gemmeke et al., "Audio Set: An Ontology and Human-Labeled Dataset for Audio Events", In Institute of Electrical and Electronic Engineers International Conference on Acoustics, Speech, and Signal Processing, New Orleans, Louisiana, Mar. 5-9, 2017, 5 pages.
Gygli et al., "Video Summarization by Learning Submodular Mixtures of Objects", In Proceedings of the Institute of Electrical and Electronic Engineers Conference on Computer Vision and Pattern Recognition, Boston, Massachusetts, Jun. 7-12, 2015, pp. 3090-3098.
Johnson et al., "Perceptual Losses for Real-Time Style Transfer and Super Resolution", In European Conference on Computer Vision, Amsterdam, The Netherlands, Oct. 8-16, 2016, 17 pages.
Jing et al., "Content-Aware Video2Comics with Manga-Style Layout", Institute of Electrical and Electronic Engineers Transactions on Multimedia, Apr. 2015, 12 pages.
Kyprianidis et al., "Image Abstraction by Structure Adaptive Filtering", In Theory and Practice of Computer Graphics, Manchester, United Kingdom, Jun. 9-11, 2008, 8 pages.
Kyprianidis et al., "State of the 'Art': A Taxonomy of Artistic Stylization Techniques for Images and Video", Institute of Electrical and Electronic Engineers Transactions on Visualization and Computer Graphics, Jul. 19, 2013, 21 pages.
Karpathy et al., "Deep Visual-Semantic Alignments for Generating Image Descriptions", In Proceedings of the Institute of Electrical and Electronic Engineers Conference on Computer Vision and Pattern Recognition, Boston, Massachusetts, Jun. 7-12, 2015, pp. 3128-3137.
Kang et al., "Coherent Line Drawing", In Proceedings of the $5^{th}$ International Symposium on Non-Photorealistic Animation and Rendering, San Diego, California, Aug. 4-5, 2007, 8 pages.
Kang et al., "Flow-Based Image Abstraction", Institute of Electrical and Electronic Engineers Transactions on Visualization and Computer Graphics, vol. 15, No. 1, 2009, pp. 62-76.
Liu et al., "A Hierarchical Visual Model for Video Object Summarization", Institute of Electrical and Electronic Engineers Transactions on Pattern Analysis and Machine Intelligence, vol. 32, No. 12, 2010, 13 pages.
Liu et al., "Learning to Detect a Salient Object", Institute of Electrical and Electronic Engineers Transactions on Pattern Analysis and Machine Intelligence, vol. 33, No. 2, 8 pages.
Liu et al., "Single Shot Multibox Detector", In European Conference on Computer Vision, Amsterdam, The Netherlands, Oct. 8-16, 2016, 17 pages.
Louchet, "Total Variation as a Local Filter", Society for Industrial and Applied Mathematics Journal on Imaging Sciences, vol. 4, No. 2, Paris, France, Mar. 4, 2011, pp. 651-694.
Müller et al., "Procedural Modeling of Buildings", vol. 25, In Association for Computing Machinery Transactions on Graphics, New York, New York, 2006, 10 pages.
Nandisha et al., "Piracy Detection App of Android Applications", International Journal of Computer Applications, vol. 146, No. 6, New York, New York, Jul. 2016, 5 pages.
Nishida et al., "Interactive Sketching of Urban Procedural Models", Association for Computing Machinery Transactions on Graphics, New York , New York, Oct. 10, 2016, 12 pages.
Rivest, "The Md5 Message-Digest Algorithm", Apr. 1992, 21 pages.
Ragan-Kelley et al., "Decoupling Algorithms from Schedules for Easy Optimization of Image Processing Pipelines", Association for Computing Machinery Transactions on Graphics, New York, New York, Jul. 2012, 12 pages.
Ryu et al., Cinetoon: A Semi-Automated System for Rendering Black/White Comic Books from Video Streams, In Computer and Information Technology Workshops, Sydney, Australia, Jul. 8-11, 2008, 6 pages.
Sobel, "An Isotropic 3 x 3 Image Gradient Operation", Machine Vision for Three-Dimensional Scenes, 1990, pp. 376-379.
Talebi et al., "Fast Multi-Layer Laplacian Enhancement", Institute of Electrical and Electronic Engineers on Computational Imaging, 2016, 13 pages.
Talebi et al., "NIMA: Neural Image Assessment", arXiv:1709.05424v1, Sep. 15, 2017, 13 pages.
Vanegas et al., "Inverse Design of Urban Procedural Models", Association for Computing Machinery Transactions on Graphics, New York, New York, 2012, 11 pages.
Wang et al., "Movie2Comics: Towards a Lively Video Content Presentation", Institute of Electrical and Electronic Engineers Transactions on Multimedia, vol. 13, No. 3, Jun. 2012, pp. 858-870.
Winnemoller et al., "Real-Time Video Abstraction", vol. 25, In Association for Computing Machinery Transactions on Graphics, New York, New York, 2006, 6 pages.
Winnemoller et al., "XDoG: An eXtended difference-of-Gaussians compendium including advanced image stylization", Computers & Graphics, 2012, 15 pages.
Zhang et al., "An Integrated System for Content-Based Video Retrieval and Browsing", Pattern Recognition, vol. 30, No. 4, Great Britain, Jul. 30, 1996, pp. 643-658.
Zhang et al., "Summary Transfer: Exemplar-Based Subset Selection for Video Summarization", In Proceedings of the Institute of Electrical and Electronic Engineers Conference on Computer Vision and Pattern Recognition, Las Vegas, Nevada, Jun. 2016, 9 pages.

* cited by examiner

SYSTEMS AND METHODS FOR GENERATING A SUMMARY STORYBOARD FROM A PLURALITY OF IMAGE FRAMES

FIELD

The present disclosure relates generally to video and image summarization. More particularly, the present disclosure relates to generating a summary storyboard from a plurality of image frames.

BACKGROUND

Generating graphical summaries of image collections or video can be slow and tedious. For example, generating graphical summaries can often demand significant computing resources which can make such a task difficult or impractical to perform on devices that have limited resources, such as smartphones. Additionally, generating such summaries can require extensive user input, including, for example image selection, image arranging, etc.

SUMMARY

Aspects and advantages of embodiments of the present disclosure will be set forth in part in the following description, or can be learned from the description, or can be learned through practice of the embodiments.

One example aspect of the present disclosure is directed to systems and methods that generate a summary storyboard from a plurality of image frames. An example computer-implemented method can include inputting a plurality of image frames into a machine-learned model and receiving as an output of the machine-learned model, object data that describes the respective locations of a plurality of objects recognized in the plurality of image frames. The method can include generating a plurality of image crops that respectively include the plurality of objects and arranging two or more of the plurality of image crops to generate a storyboard.

Another example aspect of the present disclosure is directed to a computer-implemented method of processing a video file. The video file can include a plurality of image frames. The method can include selecting from the plurality of image frames, a number of image frames. The method can include selecting an image layout from a plurality of pre-stored image layouts, and each image layout can include a number of image placeholders corresponding to the number of image frames. The method can include detecting, using a machine learned object detection model, a location of an object in each of the number of image frames. The method can include cropping each key image frame based on the detected location of the respective object within the image frame. The method can include combining the plurality of cropped image frames with the selected image layout to generate an output image, by inserting one of the plurality of cropped image frames into each of the image placeholders in the selected image layout. The method can include outputting for display, the generated output image.

Another example aspect of the present disclosure is directed to a computer system including one or more processors and one or more non-transitory computer-readable media that store instructions that, when executed by the one or more processors, cause the computer system to perform operations. The operations include selecting a plurality of image frames from a video and inputting the plurality of image frames into a machine-learned model. The operations include receiving, as an output of the machine-learned model, a plurality of image crops and arranging two or more of the plurality of image crops to generate a storyboard. The operations include providing the storyboard for display to a user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
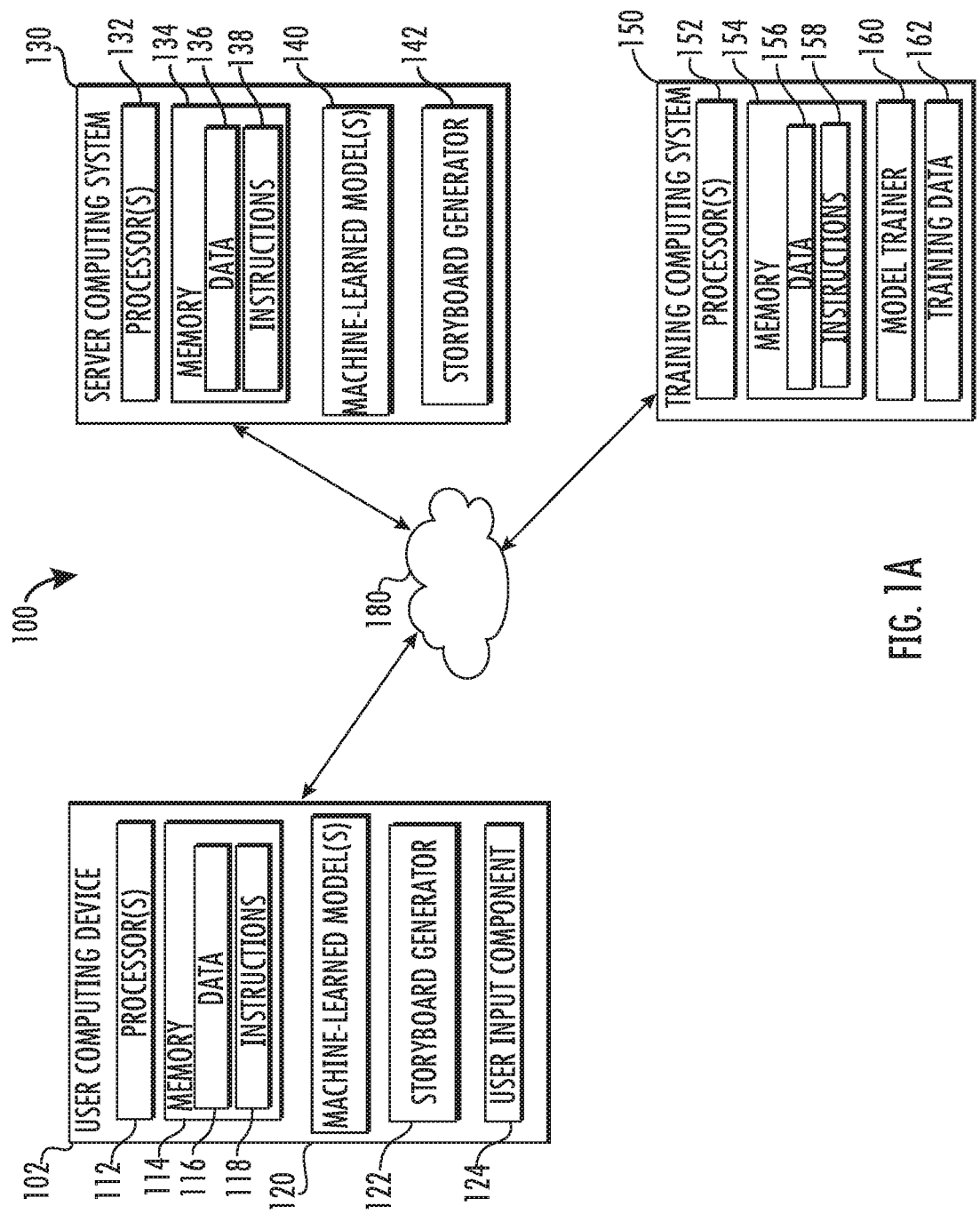
FIG. 1A depicts a block diagram of an example computing system that generates storyboards according to example aspects of the present disclosure.

Reference numerals that are repeated across plural figures are intended to identify the same features in various implementations.

DETAILED DESCRIPTION

Overview

Generally, the present disclosure is directed to systems and methods that generate a summary storyboard from a plurality of image frames. For example, the plurality of image frames can be included in or selected from an image collection or photo album or the plurality of images can be a plurality of image frames selected from a video. The plurality of image frames can be any suitable visual content, however, including for example, gif images, multimedia, stereo visual content, panoramas, etc. In some implementations, the systems and methods of the present disclosure can include or otherwise leverage use of one or more machine-learned models. For example, in some implementations, a machine-learned object recognition model can be trained to receive the plurality of image frames and output object data that describes the respective locations of a plurality of objects recognized in the plurality of image frames. The systems and methods of the present disclosure can generate a plurality of image crops that respectively include the plurality of objects and can arrange two or more of the plurality of image crops to generate the storyboard. Thus, the systems and methods described herein can generate a concise graphical summary of the plurality of images (e.g., the video) in the form of a storyboard. In particular, the systems and methods described herein can generate the storyboard using minimal computational resources, which can result in faster and more efficient execution relative to other video summary techniques. For example, in accordance with aspects of the present disclosure, in some implementations, the methods described herein can be quickly performed on a user computing device such as, for example, a smartphone because of the reduced computational demands. As such, aspects of the present disclosure can improve accessibility to video summary generation, including, for example, in scenarios in which cloud computing is unavailable or otherwise undesirable (e.g., for reasons of improving user privacy and/or reducing communication cost).

More particularly, aspects of the present disclosure provide video summarization methods implemented or otherwise executed by a computing system. In one example, a server computing device (e.g., a search server) can implement the methods described herein to provide storyboards based on videos or photo albums uploaded by users on a user computing device (e.g., a smartphone) or otherwise accessed from a cloud storage location. As another example, a single computing device such as, for example, a user computing device (e.g., smartphone, tablet, personal assistant device, etc.) can implement the methods described herein to generate storyboards locally on the user device (e.g., without connectivity to a server computing device) and can provide the storyboards to the user by, for example, displaying the storyboard on a display of the user computing device.

According to an aspect of the present disclosure, the summary storyboard can be generated from a plurality of images. In some implementations, a computing system can obtain a video and can select a plurality of image frames from the video to form a summary frame set that summarizes the video. In other implementations, the plurality of images can include or be selected from an image album (e.g., an image album generated by a user and/or an image album automatically generated based on common scenes, common time frame of capture, and/or other image characteristics).

In some implementations, to select the plurality of image frames, the computing system can divide the video into a plurality of video segments. In some implementations, at least one image frame can be selected from each of the plurality of video segments to form a summary frame set that summarizes the video. However, any number of image frames can be selected from any number of the video segments.

In some implementations, the video can be divided into a plurality of video segments of equal length. In other implementations, the computing system can divide the video into a plurality of video segments and/or select the plurality of image frames from the video based at least in part on (1) motion detected within the video, (2) scene changes detected within the video, and/or (3) objects detected within the video.

Thus, as one example, the computing system can input the video into a motion-detection model. The motion-detection model can be trained to output a motion data that describes movement information associated with objects recognized in the video. The motion data can be used to divide the video into the plurality of video segments and/or to select certain of the images (e.g., for inclusion in the summary frame set).

As another example, the video can be divided into a plurality of video segments and/or the plurality of image frames can be selected based at least in part on scene changes detected within the video. For example, adjacent frames within the video can be compared to detect changes in composition, lighting, etc., and such detected changes can be used to identify the scene changes. As such, the method can provide a storyboard that better summarizes the information contained within respective scenes of the video.

As yet another example, as will be discussed further below, the video can be divided and/or the image frames can be selected based on objects detected within the image frames. For example, as will be discussed further below, some or all of the image frames included in the video or in the image album can be input into a machine-learned object recognition model that detects objects within the images. Certain images can be selected (e.g., for inclusion in the summary frame set) based on the presence of certain objects within such images.

In other implementations, the method can include selecting the plurality of image frames to form the summary frame set without dividing the video into a plurality of video segments. For instance, in some implementations, the plurality of image frames can include a plurality of keyframes from the encoded video. For example, in some implementations, the keyframes can be evenly distributed throughout the video. Thus, selecting the keyframes can cause the plurality of image frames to have a uniform time distribution with respect to the video. In some implementations, such a selection can provide a plurality of images that adequately summarize information contained within the video while minimizing the computational demand involved in performing such a selection. As such, the method can provide fast and efficient generation of storyboards. In further implementations, the images considered for selection into the summary set of frames is limited to keyframes of the video.

According to another aspect of the present disclosure, including duplicate, or near-duplicate, images within the storyboard may not provide any additional information, and thus, may reduce the effectiveness of the storyboard in summarizing the video. As such, in some implementations, as part of the image frame selection process, the computing system can eliminate similar images from inclusion in the storyboard. Such elimination can occur at any suitable stage. For instance, images can be eliminated from the plurality of images before inputting the plurality of images into the machine-learned object recognition model.

As one example, in some implementations, the method can employ a modified perceptual hashing to detect and eliminate very similar images. For instance, the modified perceptual hashing can include converting images to grayscale, downscaling the grayscale images to low resolution versions, computing vertical and/or horizontal gradients that describe the low resolution versions, and comparing the resulting gradients. Specifically, in some implementations, downscaling can include recursively downscaling by a factor of two until the resolution of the image reaches a closest scale factor and then applying a final area filter downscale. This may allow the image to be downscaled to a low resolution version using less computational power than traditional downscaling techniques.

As another example, in some implementations, the computing system can eliminate images based on image quality, which can include exposure, contrast, and/or blurriness etc.

For instance, in some implementations, a sharpness metric can be calculated based on a subsampled gradient of the image (e.g., central, forward, or backward difference gradient). Such an approach can provide an efficient method of detecting blurry images that involve a low computational demand. In other embodiments, an image-rating machine-learned model can be employed to grade or rate the sharpness of images. For instance, a neural network, such as convolutional neural network can be trained to receive as an input, an image, and output a sharpness metric that describes the sharpness of the image.

According to another aspect of the present disclosure, the computing system (e.g., the server computing device and/or the user computing device) can input the plurality of images (e.g., the selected images that form the summary frame set) into a machine-learned object recognition model. The computing system can receive, as an output of the machine-learned object recognition model, object data that includes a plurality of bounding shapes that describe the respective locations of the plurality of objects recognized in the plurality of image frames.

The computing system can generate a plurality of image crops based at least in part on the plurality of bounding shapes. For example, for each bounding shape around an object, the computing system can add a certain margin (e.g., 20 pixels, 10% of the bounding shape height/width, or some other margin) around the perimeter of such bounding shape and then extract (e.g., by cropping) the bounding shape plus outer margin. In other implementations, the bounding boxes are simply extracted without any margin being added. One or more image crops can be extracted for each image frame for which one or more objects were detected.

Similar to the elimination of similar image frames discussed above, in some embodiments, duplicate or near-duplicate image crops can be identified and eliminated (e.g., discarded). For example, any of the techniques described above for identifying similar image frames can also be used to identify and discard similar image crops. In some implementations, duplicate images can be eliminated any suitable stage during generating the storyboard.

According to another aspect of the present disclosure, the computing system can arrange two or more of the plurality of image crops to generate a storyboard. As one example, in some implementations, to generate the storyboard, the computing system can obtain a storyboard template that includes a number of panels. Each panel can have a respective panel aspect ratio, and two or more of the plurality of image crops can be selected for insertion into the storyboard template based at least in part on a comparison of aspect ratios. For example, the computing system can compare a respective crop aspect ratio associated with at least two or more image crops with the respective panel aspect ratio associated with at least two of the panels. Stated differently, the computing system can attempt to match image crops to storyboard panels based on a degree of matching between their corresponding aspect ratios.

As such, in some implementations, the computing system can effectively select regions of interest within the plurality of images to include in the storyboard. Additionally, in some embodiments, the method can do such with minimal computational demand. For instance, generating a plurality of image crops and then selecting a subset (i.e., two or more) for inclusion in the storyboard may require less computational power than considering the aspect ratios of the storyboard when generating the plurality of image crops.

In some implementations, the storyboard template can be selected from a predetermined set of storyboard templates. For example, in some implementations, the storyboard template can be randomly selected from the predetermined set of storyboard templates. In other embodiments, however, the storyboard template can be generated based on a set of rules governing various characteristics of the storyboard template, such as the number of panels, maximum and/or minimum panel sizes, and the permissible arrangement of the panels within the storyboard. Thus, in some examples, the storyboard template can be selected (e.g., through performance of an optimization procedure) based on the size and/or shapes of the image crops, the amount and type of motion detected, an original aspect ratio of the video (e.g., portrait or landscape), and the like.

In some implementations, the computing system can arrange the two or more of the plurality of image crops according to a chronological order. As such, the resulting storyboard can preserve the "story" aspect of the information contained within the video.

Additionally, in some implementations, the computing system can receive as the output of the machine-learned object recognition model a plurality of semantic labels that respectively describe the plurality of objects recognized in the plurality of image frames. The computing system can arrange the two or more of the plurality of image crops to generate the storyboard by selecting the two or more of the plurality of image crops based at least in part on the plurality of semantic labels.

In some implementations, the computing system can apply an audio graphic based at least in part on at least one of the semantic labels that describes at least one object included in at least one of the two or more of the plurality of image crops. For example, in some implementations the semantic label can be an object category (e.g., car, person, etc.), and the audio graphic could be indicative of an action (e.g., "vroom" by a car) or a spoken word (e.g., a dialog bubble next to a person's face that has been labeled as speaking).

As another example, the computing system can select two or more of the plurality of image crops that depict a same object in motion. For example, if two or more image crops show an object such as, for example, a children's toy vehicle in motion, selecting two or more image crops for inclusion in the storyboard can result in the storyboard providing a visual effect showing the object in motion over a number of panels, which can have the effect of "telling" the story.

As another example, in some implementations, the method can also include applying a stylization effect to the two or more image crops arranged to form the storyboard. In some implementations, the stylization effect can be configured to provide a comic-like look and improve the visual appeal of the storyboard. Such a storyboard can have an aesthetically pleasing appearance. As examples, the stylization effects can be achieved through the application of one or more filters (e.g., bilateral filters). In some implementations, the stylization effects and/or filters applied can be selected by the user.

According to aspects of the present disclosure, in some implementations, a smartphone can generate the storyboard. In some of such implementations, the storyboard can have a storyboard aspect ratio that matches a screen aspect ratio associated with a display screen of the smartphone. Thus, for example, the storyboard can provide a summary of the video while still being able to be displayed on a single display screen.

In some implementations, the method can include providing the storyboard for display to a user and receiving a feedback from the user. For instance, in some implementations, the storyboard can be displayed on a smartphone to the user, and if the user wishes to keep the storyboard (e.g., store, share, etc.), the user can indicate such, for example, by swiping in a first direction across a touchscreen interface of the smartphone. However, if the user does not wish to keep the storyboard, the user can swipe in a second direction.

In response to receiving the feedback from the user indicating that the user does not wish to keep the storyboard, a new storyboard can be generated. The new storyboard can be different from the original storyboard. For example, in some implementations, certain inputs can be randomized or randomly varied within a predetermined set of potential inputs. For instance, the new storyboard can be generated using a new selection of images from the video, new parameters of the recognition of objects via the object recognition model, a new storyboard template, new stylization effects, etc. Moreover, because aspects of the disclosed method provide for efficient operation, the new storyboard can be quickly generated, for example, locally on the user device, such as a smartphone. As such, the user can be able to quickly generate new storyboards until the user finds an appealing one.

As indicated above, in accordance with aspects of the present disclosure, the method can be performed on the one or more computing devices with low computational demands.

Further, generating storyboards that summarize a plurality of images, such as a video, can have many uses. For instance, such a storyboard may be able to convey the information contained within a video to a user more efficiently than viewing the entire video. Moreover, such storyboards (e.g., in the form of image files) can store information in a far more space-efficient manner than video files. In some implementations, the storyboard can effectively provide a 'compressed' version of the video or image files such that less bandwidth is required to transmit the compressed version as compared with the original files. Additionally, as discussed above, aspects of the present disclosure can provide a method for generating storyboards using less computational resources than would otherwise be needed. As such, users can execute such a method on a local computing device that has limited resources, such as a smartphone, for example. This can allow users to quickly generate a storyboard that summarizes a video even when access to cloud computing is unavailable, limited, or prohibitively slow. Lastly, the ability to quickly generate a storyboard locally on a smartphone, for example, can provide additional benefits. For instance, the user can quickly generate new and different storyboards from the same input video. This may allow the user to quickly generate a storyboard that is visually appealing without having to manually select or alter input parameters associated with performing the method.

In this way, the disclosed method can provide an output image which summarizes the content of an input video file. A memorable summary provided in the form of an output image can allow the user to recognize a video file in a shorter time, for example, to select a video file from a list of video files. As such, the provision of one or more output images generated according to the method can provide a more efficient user experience in relation to the video file or files. Such improvements in user experience can lead to particular advantages in, for example, mobile devices, in which an improved user experience can reduce the required time for a user to complete their interaction with the device, which can lead to a reduction in the active time of the device and a corresponding reduction in the power consumption of the device. By generating an output image using selected key image frames which are cropped based on the detected location of an object within in frame, a video file summary can be particularly based on one of more objects detected therein. Such detected objects can be easily recognized by a user and so a memorable summary of a video can be generated using efficient computational processes. The method can generate an output image without detailed computational analysis of the video file, reducing the processing requirements and, consequently, the power consumption requirements to display a summary of a video file.

Additional example uses for which the systems and methods of the present disclosure include: reviewing video footage (e.g., security footage), social media applications, or other instances in which video summarization with low computational requirements is desirable.

With reference now to the Figures, example embodiments of the present disclosure will be discussed in further detail.

Example Devices and Systems

FIG. 1A depicts a block diagram of an example computing system 100 that can be configured to implement or otherwise execute the systems and methods of the present disclosure. The system 100 can include a user computing device 102, a server computing system 130, and/or a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120, such as machine-learned object recognition models and/or motion-detection models. For example, the machine-learned model(s) 120 can be or can otherwise neural networks or other multi-layer non-linear models. In some implementations, the neural networks can include recurrent neural networks (e.g., long short-term memory recurrent neural networks), sequence-to-sequence neural networks, feed-forward neural networks, or any other suitable form of neural networks.

In some implementations, one or more machine-learned model(s) 120 can be received from the server computing system 130 over a network 180, stored in the user computing device memory 114, and the used or otherwise implemented by the one or more processors 112. In some implementations, the user computing device 102 can implement multiple parallel instances of a single machine-learned model 120 (e.g., to perform parallel object or motion recognition of across multiple instances of the machine-learned models 120).

The user computing device 102 can store or include one or more storyboard generator(s) 122. The storyboard generator(s) 122 can be configured to generate one or more summary storyboards from a plurality of image frames. For example, in some embodiments, the storyboard generator(s) 122 can receive object data that describes the respective locations of a plurality of objects recognized in the plurality of image frames as an output of the machine-learned object recognition model(s) 120. In some embodiments, the storyboard generator(s) 122 can generate a plurality of image crops that respectively include the plurality of objects and can arrange two or more of the plurality of image crops to generate the storyboard, as discussed in greater detail below with reference to FIGS. 3-5.

In some implementations, one or more storyboard generator(s) 122 can be received from the server computing system 130 over a network 180, stored in the user computing device memory 114, and the used or otherwise implemented by the one or more processors 112. In some implementations, the user computing device 102 can implement multiple parallel instances of a single storyboard generator(s) 122 (e.g., to generate one or more summary storyboards from a plurality of image frames).

Additionally or alternatively, one or more machine-learned models 140 and/or storyboard generator(s) 142 can be included in or otherwise stored and implemented by the server computing system 130 that communicates with the user computing device 102 according to a client-server relationship. For example, the machine-learned models 140 and/or storyboard generator(s) 142 can be implemented by the server computing system 140 as a portion of a web service (e.g., a personal assistant service). Thus, one or more models 120 can be stored and implemented at the user computing device 102 and/or one or more models 140 can be stored and implemented at the server computing system 130. Similarly, one or more storyboard generator(s) 122 can be stored and implemented at the user computing device 102 and/or one or more storyboard generator(s) 142 can be stored and implemented at the server computing system 130.

The storyboard generator 122 includes computer logic utilized to provide desired functionality. The storyboard generator 122 can be implemented in hardware, firmware, and/or software controlling a general purpose processor. For example, in some implementations, the storyboard generator 122 includes program files stored on a storage device, loaded into a memory and executed by one or more processors. In other implementations, the storyboard generator 122 includes one or more sets of computer-executable instructions that are stored in a tangible computer-readable storage medium such as RAM hard disk or optical or magnetic media.

The user computing device 102 can also include one or more user input components 124 that receives user input. For example, the user input component 124 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. In some embodiments, the user input component 124 can include a camera (e.g., a front-facing or rear-facing smartphone camera).

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the machine-learned models 140 can be or can otherwise include various machine-learned models such as neural networks (e.g., recurrent neural networks) or other multi-layer non-linear models. Example models 140 are discussed with reference to FIG. 2.

The server computing system 130 can train the models 140 via interaction with the training computing system 150 that is communicatively coupled over the network 180. The training computing system 150 can be separate from the server computing system 130 or can be a portion of the server computing system 130.

As described above, the server computing system 130 can store or otherwise include one or more the storyboard generator(s) 142. Example storyboard generators 142 are discussed with reference to FIGS. 3-5.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a machine-learned object recognition model 140 based on a set of training object data 162. The training data 162 can include, for example, a set of training images and a set of training object data that describes respective locations of a plurality of objects depicted in the set of training images.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
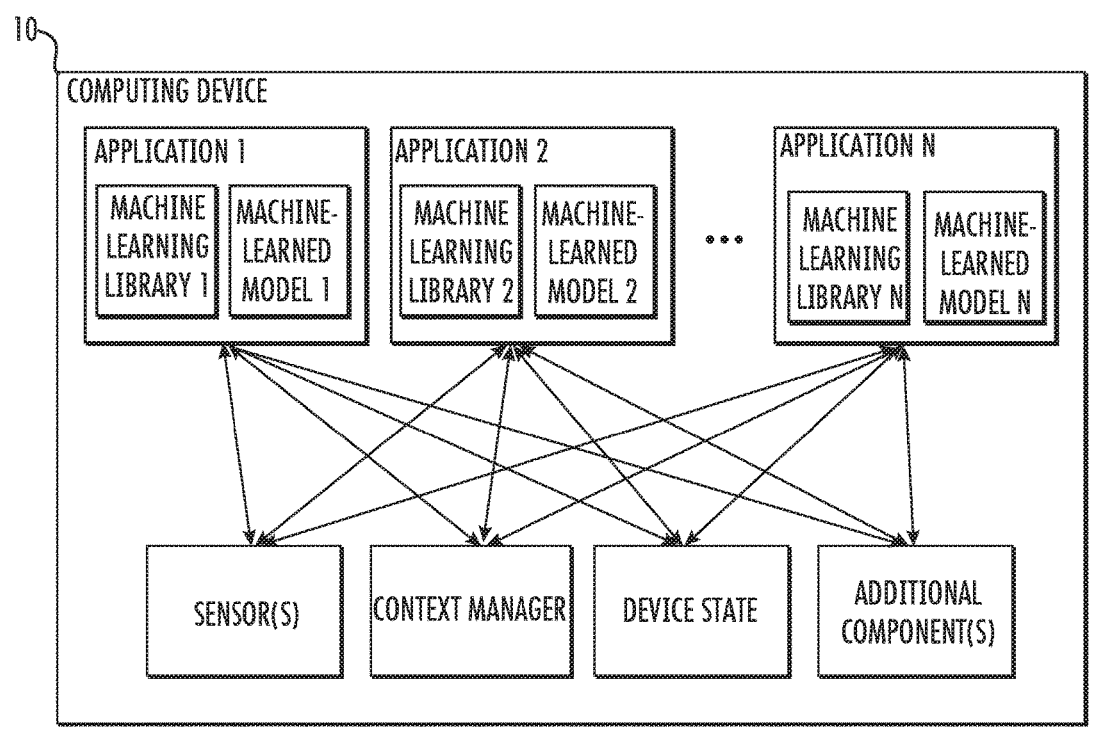
FIG. 1B depicts a block diagram of an example computing system that generates storyboards according to example aspects of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors (e.g., cameras), a context manager, a device state component, and/or additional components. In some implementations, each application can communicate with each device component using an API (e.g., a public API). In some implementations, the API used by each application is specific to that application.

Figure 1C:
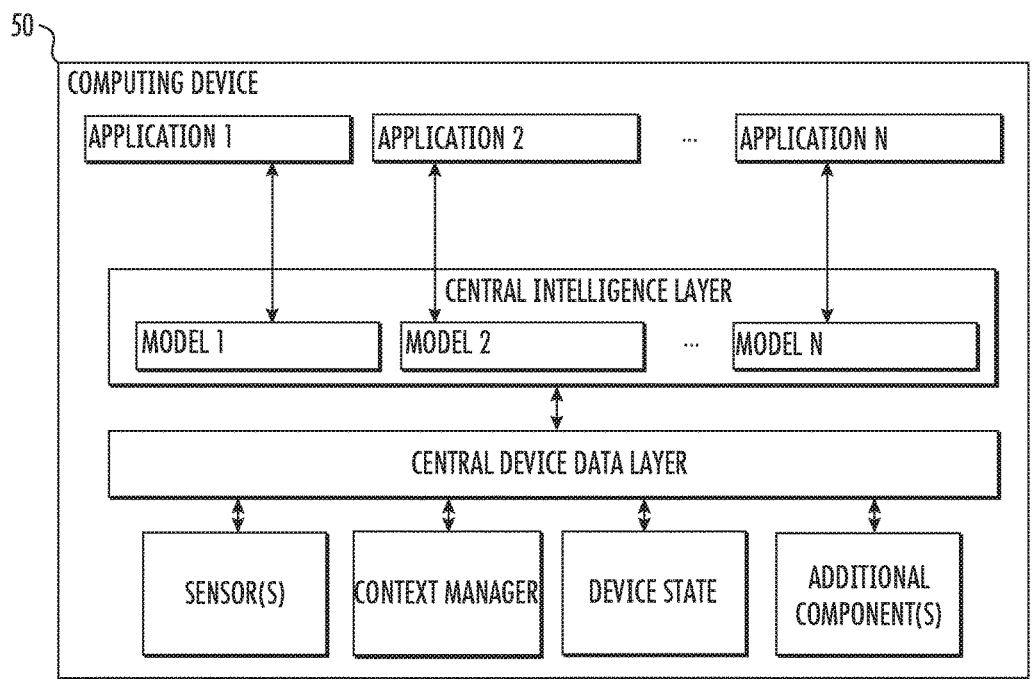
FIG. 1C depicts a block diagram of an example computing system that generates storyboards according to example aspects of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., an object recognition model) can be provided for each application and managed by the central intelligence layer. In other implementations, two or more applications can share a single machine-learned model. For example, in some implementations, the central intelligence layer can provide a single model (e.g., a single object recognition model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangement

Figure 2:
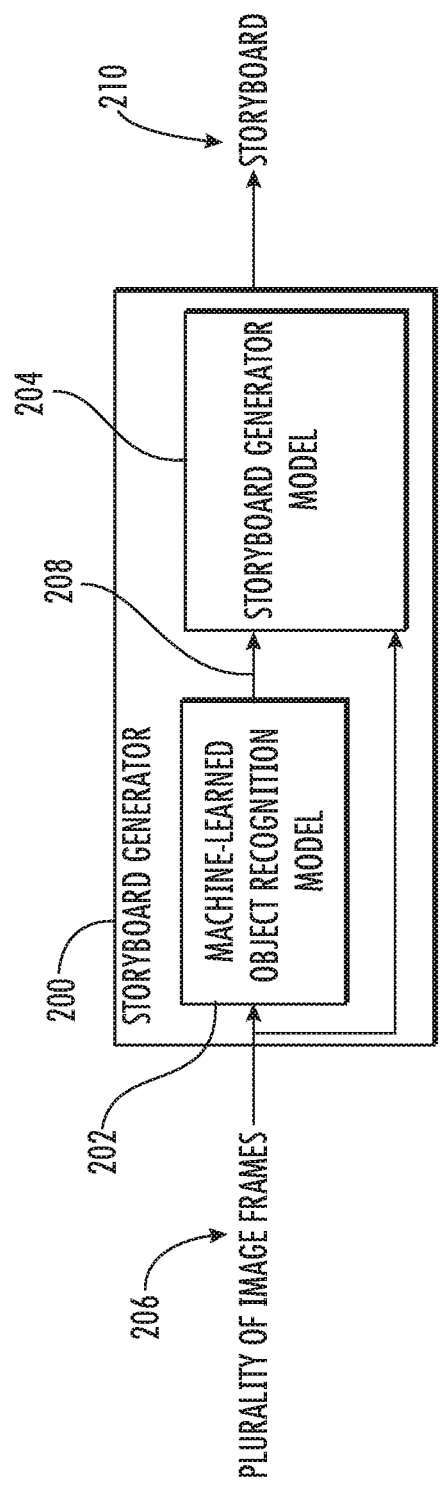
FIG. 2 depicts a block diagram of an example storyboard generator according to example aspects of the present disclosure.

FIG. 2 depicts a block diagram of an example storyboard generator 200 according to example embodiments of the present disclosure. In some implementations, the storyboard generator can include a machine-learned object recognition model 202 and a storyboard generator model 204.

In some implementations, the machine-learned object recognition model 202 can be trained to receive a plurality of image frames 206 and output object data 208 that describes the respective locations of a plurality of objects recognized in the plurality of image frames 206. For example, the plurality of image frames 206 can be included in or selected from an image collection or photo album. In some embodiments, the plurality of images can be a plurality of image frames selected from a video. The plurality of image frames can be any suitable visual content, however. In some implementations, the machine-learned object recognition model 202 can be configured as a deep neural network (see Liu, Wei et al. SSD: Single Shot MultiBox Detector. *In European conference on computer vision* (2016), Springer, pp. 21-37).

Additionally, in some implementations, the storyboard generator 200 can include multiple machine-learned object recognition models 202 optimized to detect specific classes of objects. More specifically, in some implementations, at least one object recognition model 202 can be optimized to detect faces. In other implementations, the storyboard generator 200 can include object recognition models 202 optimized to detect additional classes of objects, such as vehicles, plates of food, animals etc.

In some implementations, the storyboard generator 200 can include other types of machine learned models. For example, in one implementation, a motion-detection model and/or the object recognition model 202 can be configured to additional detect motion. The motion-detection model can be trained to output a motion data that describes movement information associated with objects recognized in a video. In some implementations, the storyboard generator 200 can include an image-rating machine-learned model configured to receive as an input, an image, and output a sharpness metric that describes the sharpness of the image. In some embodiments, additional machine-learned models can be employed to perform other processes that are described herein.

In some embodiments, the storyboard generator 200 can be configured to input the plurality of image frames 206 into the machine-learned object recognition model 202 and receive as an output of the machine-learned object recognition model 202, object data 208 that describes the respective locations of a plurality of objects recognized in the plurality of image frames 206. The storyboard generator model 204 can be configured to generate a storyboard 210 using two or more of the plurality of image frames 206 and the object data 208. For example, in some embodiments, the storyboard generator model 204 can be configured to generate a plurality of image crops that respectively include the plurality of objects that are described by the object data 208. The storyboard generator model 204 can also be configured to arrange two or more of the plurality of image crops to generate the storyboard 210. Example implementations of storyboard generating methods in accordance with aspects of the present disclosure are discussed below with reference to FIGS. 3-5.

Illustrative Example

Figure 3A:
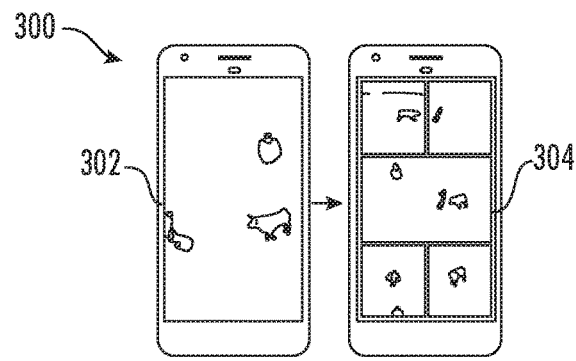
FIGS. 3A and 3B depict a flow chart diagram of an example embodiment of a method for generating storyboards according to example aspects of the present disclosure.

FIG. 3A depicts an illustrative example of one implementation of the methods and systems disclosed herein. In accordance with aspects of the present disclosure, in some implementations, the methods described herein can be quickly performed on a user computing device such as, for example, a smartphone 300. In some implementations, plurality of image frames can be input into the smartphone 300. For instance, the smartphone 300 can include a camera that can be used to capture a plurality of image frames 302. In some embodiments, plurality of image frames 302 can be a video and/or include or otherwise be selected from an image album (e.g., an image album generated by a user and/or an image album automatically generated based on common scenes, common time frame of capture, and/or other image characteristics). The plurality of image frames 302 can alternatively be received from other sources, such as downloaded from a website, retrieved from local memory, or retrieved from cloud storage, e.g., from a server computing system. In some implementations, the image frames 302 can be directly captured from a camera of the smartphone 300.

In accordance with aspects of the present disclosure, one or more storyboards 304 can be generated using the plurality of image frames 302. In some implementations, the storyboard(s) 304 can have a storyboard aspect ratio that matches a screen aspect ratio associated with a display screen of the smartphone 300. Thus, for example, the storyboard(s) 304 can provide a summary of the plurality of image frames 302 that are sized for being displayed on a single display screen. In some implementations, the storyboard(s) 304 can be generated in real time (e.g., as image frames 302 are captured by the camera of the smartphone 304.)

Figure 3B:
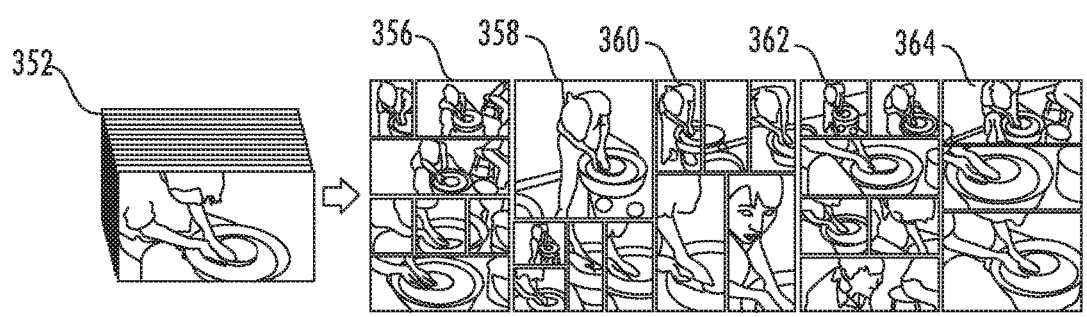

FIG. 3B depicts another illustrative example of one implementation of the methods and systems disclosed herein. In some implementations, a second plurality of image frames 352 can be input into a user computing device, such as a smartphone for example. In some embodiments, a first storyboard 356 can be displayed to a user, and based on the feedback received from the user, new storyboards 358-364 can be generated and displayed to the user. For instance, in some implementations, if the user wishes to keep (e.g., store, share, etc.) the first storyboard 356, the user can indicate such, for example, by swiping in a first direction across a touchscreen interface of the smartphone. However, if the user does not wish to keep the first storyboard 356, the user can swipe in a second direction.

In response to receiving the feedback from the user indicating that the user does not wish to keep the first storyboard 356, a new storyboard 358 can be generated. The new storyboard 358 can be different from the original storyboard 356. For example, in some implementations, certain inputs can be randomized or randomly varied within a predetermined set of potential inputs. For instance, the new storyboard 358 can be generated using a new selection of images from the video, new parameters of the recognition of objects via the object recognition model, a new storyboard template, new stylization effects etc. Moreover, because aspects of the disclosed method provide for efficient operation, the new storyboards 358-364 can be quickly generated, for example, locally on the user computing device, e.g., a smartphone. As such, the user can be able to quickly generate new storyboards 358-364 until the user finds an appealing one.

Example Methods

Figure 4A:
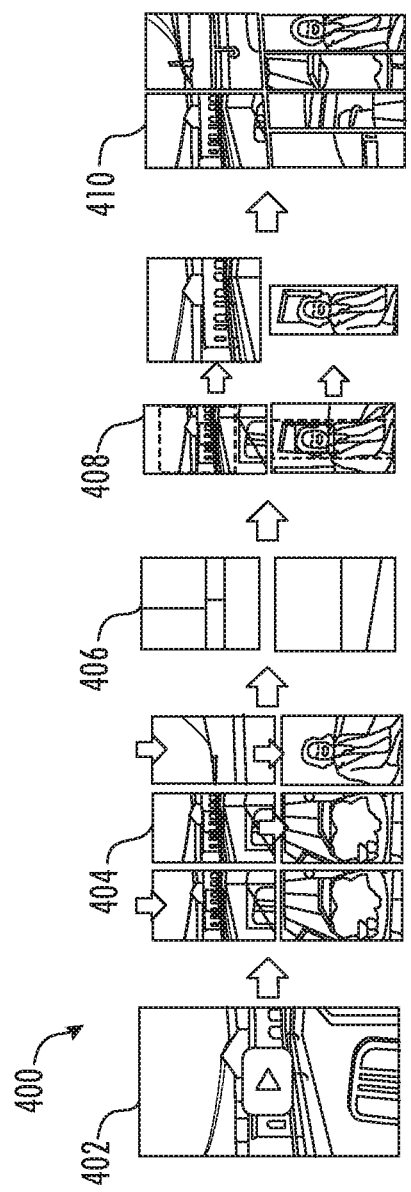
FIGS. 4A and 4B depicts a flow chart diagram of an example embodiment of a method for generating storyboards according to example aspects of the present disclosure.
Figure 4B:
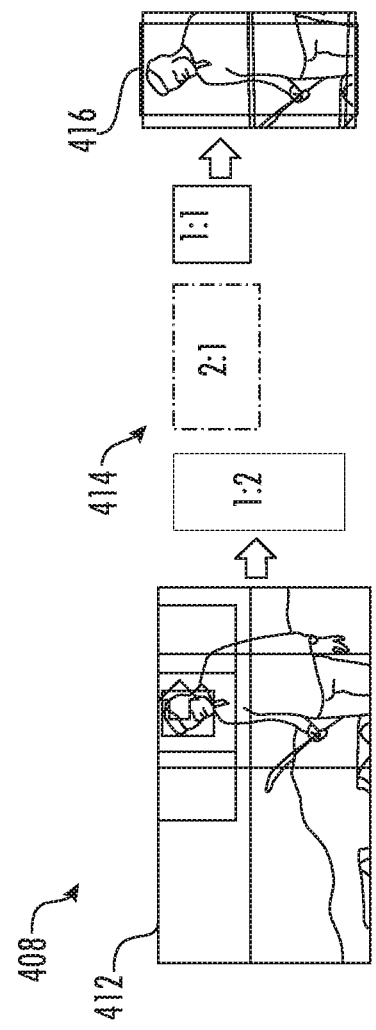

FIGS. 4A and 4B depict flow chart diagrams of an example method 400 according to example embodiments of the present disclosure. Although FIGS. 4A and 4B depict steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At (402), a computing system can obtain an image collection. The image collection can be a photo album, video, or any other suitable image collection (e.g., an image album generated by a user and/or an image album automatically generated based on common scenes, common time frame of capture, and/or other image characteristics). The image collection can be any suitable visual content including for example, gif images, multimedia, stereo visual content, panoramas, etc. The computing system can obtain the image collection from any available source such as, local data storage, cloud data storage, or directly from a camera, for example.

At (404), in some implementations, the computing system can select a plurality of image frames from the image collection (e.g., photo album, and/or video) to form a summary frame set that summarizes the image collection. For example, in some embodiments, the computing system can select the plurality of image frames from a video to form a summary frame set that summarizes the video. For example, in some embodiments, the computing system can divide a video into a plurality of video segments to select the summary frame set. In some implementations, at least one image frame can be selected from each of the plurality of video segments to form a summary frame set that summarizes the video. However, any number of image frames can be selected from any number of the video segments.

In some implementations, the video can be divided into a plurality of video segments of equal length. In other implementations, the computing system can divide the video into a plurality of video segments and/or select the plurality of image frames from the video based at least in part on (1) motion detected within the video, (2) scene changes detected within the video, and/or (3) objects detected within the video.

Thus, as one example, the computing system can input the video into a motion-detection model, for example as discussed with reference to FIGS. 1-2. The motion-detection model can be trained to output a motion data that describes movement information associated with objects recognized in the video. The motion data can be used to divide the video into the plurality of video segments and/or to select certain of the images (e.g., for inclusion in the summary frame set).

As another example, the video can be divided into a plurality of video segments and/or the plurality of image frames can be selected based at least in part on scene changes detected within the video. For example, adjacent frames within the video can be compared to detect changes in composition, lighting, etc., and such detected changes can be used to identify the scene changes. As such, the method 400 can provide a storyboard that better summarizes the information contained within respective scenes of the video.

As yet another example, as will be discussed further below, the video can be divided and/or the image fames can be selected based on objects detected within the image frames. For example, as will be discussed further below, some or all of the image frames included in the video or in the image album can be input into a machine-learned object recognition model that detects objects within the images. Certain images can be selected (e.g., for inclusion in the summary frame set) based on the presence of certain objects within such images.

In other implementations, the method 400 can include selecting the plurality of image frames to form the summary frame set without dividing the video into a plurality of video segments. For instance, in some implementations, the plurality of image frames can include a plurality of keyframes from the encoded video. For example, in some implementations, the keyframes can be evenly distributed throughout the video. Thus, selecting the keyframes can cause the plurality of image frames to have a uniform time distribution with respect to the video. In some implementations, such a selection can provide a plurality of images that adequately summarize information contained within the video while minimizing the computational demand involved in performing such a selection. As such, the method 400 can provide fast and efficient generation of storyboards. In further implementations, the images considered for selection into the summary set of frames is limited to keyframes of the video.

According to another aspect of the present disclosure, including duplicate, or near-duplicate, images within the storyboard may not provide any additional information, and thus, may reduce the effectiveness of the storyboard in summarizing the video. As such, in some implementations, as part of the image frame selection process, the computing system can eliminate similar images from inclusion in the storyboard. Such elimination can occur at any suitable stage. For instance, images can be eliminated from the plurality of images before inputting the plurality of images into the machine-learned object recognition model.

As one example, in some implementations, the method 400 can employ a modified perceptual hashing to detect and eliminate very similar images (see Nandisha M., Piracy Detection App of Android Applications. In *International Journal of Computer Applications* 146, 6 (2016)). For instance, the modified perceptual hashing can include converting images to grayscale, downscaling the grayscale images to low resolution versions, computing vertical and/or horizontal gradients that describe the low resolution versions, and comparing the resulting gradients.

As another example, in some implementations, the computing system can eliminate images based on image quality, which can include exposure, contrast, and/or blurriness etc. For instance, in some implementations, a sharpness metric can be calculated based on a subsampled version of a gradient of the image (e.g., central, forward, or backward difference gradient). Such an approach can provide an efficient method of detecting blurry images that involve a low computational demand. For example, in one embodiment, the subsampled gradient can be calculated for similar, or near-duplicate images, and the sharpness metric can be calculated based on the subsampled central difference gradient. For instance, in one embodiment, a difference gradient can be calculated as follows:

$$hist(i) = \#\{(x,y)\} \in \Omega : \lfloor \nabla(x,y) \rfloor = i$$

where $\#$ is the cardinality, $\Omega$ is the subsample domain of the image (e.g., 3 in each direction), and $\nabla$ is the gradient magnitude (e.g., central differences). The sharpness metric can then be calculated as the inverse of the coefficient of variation of the histogram as follows:

$$\text{sharpness} = \frac{\overline{hist}}{\sqrt{\overline{hist_2}}}$$

where $\overline{hist}$ describes the mean value of the histogram, and $$\sqrt{\overline{hist_2}}$$

describes the standard deviation of the histogram. While the mean value of the histogram is a good metric for sharpness between near duplicates, in some implementations, dividing the mean value of the histogram by the standard deviation of the histogram can provide a sharpness metric that is more comparable between images. In some implementations, the mean value of the histogram may be calculated as follows:

$$\overline{hist} = \frac{1}{\#\Omega} \sum_i hist(i)$$

In some implementations, the standard deviation of the histogram may be calculated as follows:

$$\sqrt{\overline{hist_2}} = \frac{\sum_i (hist(i) - \overline{hist})^2}{\#\Omega}$$

In other embodiments, an image-rating machine-learned model can be employed to grade or rate the sharpness of images. For instance, a neural network, such as convolutional neural network can be trained to receive as an input, an image, and output a sharpness metric that describes the sharpness of the image.

At (406), in some implementations, a storyboard template can be selected from a predetermined set of storyboard templates. For example, in some implementations, the storyboard template can be randomly selected from the predetermined set of storyboard templates. In other embodiments, however, the storyboard template can be generated (e.g., randomly) based on a set of rules governing various characteristics of the storyboard template, such as the number of panels, maximum and/or minimum panel sizes, and the permissible arrangement of the panels within the storyboard. Thus, in some examples, the storyboard template can be selected (e.g., through performance of an optimization procedure) based on the size and/or shapes of the image crops, the amount and type of motion detected, an original aspect ratio of the video (e.g., portrait or landscape), and the like. In some implementations, a machine-learned template-generating model can be configured to generate templates. For instance, in some implementations, the machine-learned template-generating model can be trained to generate templates having aesthetic appeal using a set of training templates.

At (408), the computing system can generate a plurality of image crops. In some embodiments, generating the image crops can include performing cropping operations based on the summary frame set. For example, referring to FIG. 4B, in some implementations, the computing system (e.g., the server computing device and/or the user computing device) can input the plurality of images 412 (e.g., the selected images that form the summary frame set) into a machine-learned object recognition model, for example as described with reference to FIGS. 1-2. The computing system can receive, as an output of the machine-learned object recognition model, object data that includes a plurality of bounding shapes 414 that describe the respective locations of the plurality of objects (e.g., people, faces, vehicles etc.) recognized in the plurality of image frames. FIG. 4B illustrates the bounding shapes 414 as superimposed over the image 412. It should be understood that, in some implementations, the bounding shapes 414 can simply be coordinates describing the edges of detected objects, for example.

The computing system can generate a plurality of image crops 416 based at least in part on the plurality of bounding shapes 414. For example, for each bounding shape 414 around an object, the computing system can add a certain margin (e.g., 20 pixels, 10% of the bounding shape height/width, or some other margin) around the perimeter of such bounding shape 414 and then extract (e.g., by cropping) the bounding shape plus outer margin. In other implementations, the bounding boxes are simply extracted without any margin being added. One or more image crops 416 can be extracted for each image frame for which one or more objects were detected.

Similar to the elimination of similar image frames discussed above, in some embodiments, duplicate or near-duplicate image crops 416 can be identified and eliminated (e.g., discarded). For example, any of the techniques described above for identifying similar image frames can also be used to identify and discard similar image crops 416.

At (410), in some embodiments, the computing system can arrange two or more of the plurality of image crops 416 to generate a storyboard. Each panel of the storyboard template obtained at (406) can have a respective panel aspect ratio, and two or more of the plurality of image crops 416 can be selected for insertion into the storyboard template based at least in part on a comparison of aspect ratios. For example, the computing system can compare a respective crop aspect ratio associated with at least two or more image crops 416 with the respective panel aspect ratio associated with at least two of the panels. Stated differently, the computing system can attempt to match image crops 416 to storyboard panels based on a degree of matching between their corresponding aspect ratios. In some implementations, a single image crop 416 can be arranged to generate the storyboard.

In some implementations, the computing system can enlarge or shrink the image crops 416 based on the size of the detected objects in each respective image crop 416. For instance, the computing system can enlarge or shrink image crops 416 based on the size of the matched storyboard panels to fit the image crops 416 into the panels of the storyboard. For instance, in some implementations, the computing system can enlarge image crops 416 to better portray the object(s) detected therein.

Additionally, in some implementations, the computing system can crop the image crops 416 according to the shapes of the matched storyboard panel. For instance, in some implementations, some of the storyboard panels can have non-rectangular shapes (e.g., triangular, rhomboid, trapezoidal etc.).

Thus, in some implementations, the computing system can effectively select regions of interest within the plurality of images 412 to include in the storyboard. Additionally, in some embodiments, the method can do such with minimal computational demand. For instance, generating a plurality of image crops 416 and then selecting a subset (i.e., two or more) for inclusion in the storyboard may require less computational power than considering the aspect ratios of the storyboard when generating the plurality of image crops 416.

In some implementations, the computing system can arrange the two or more of the plurality of image crops 416 according to a chronological order. As such, the resulting storyboard can preserve the "story" aspect of the information contained within the video.

Additionally, at (410), in some implementations, a stylization effect can be applied to the two or more image crops 416 arranged to form the storyboard. In some implementations, the stylization effect can be configured to provide a comic-like look and improve the visual appeal of the storyboard. Such a storyboard can have an aesthetically pleasing appearance. As examples, the stylization effects can be achieved through the application of one or more filters (e.g., bilateral filters). In some implementations, the stylization effects can include (1) converting from color to grayscale, (2) converting from grayscale to color, and/or (3) posterization (e.g., reducing the number of discrete colors). Stylization effects can also include adjusting various image parameters such as brightness, saturation, hue, and/or applying one or more thresholds. For example, in some implementations, the stylization effects can include applying a soft threshold function. In one implementation, the soft threshold function can apply a limit to one or more of the image parameters (e.g., brightness, saturation, hue, etc.). In some implementations, stylization effects can also include blurring, sharpening, smoothing, and/or detecting edges.

In some implementations, the stylization effects and/or filters can by selected semi-randomly using a set of rules. For instance, in some implementations, the rules can allow a random number of filters between an upper bound and a lower bound. In some implementations, the respective input parameters of the filters can similarly be chosen randomly between respective upper and lower bounds. In some implementations, some effects or filters can be applied more than once. For example, in some implementations, the number of times each filter is applied can be chosen randomly between respective upper and lower bounds defined for each filter. In other embodiments, the stylization effects/filters and/or the respective input parameters of the stylization effects/filter can be selected and/or adjusted by the user.

Additionally, in other implementations, predetermined combinations of stylization effects can be selected. For example, in some implementations, the predetermined combinations can have predetermined input parameters. In some implementations, a predetermined filter set (e.g., a particular combination of filters and/or effects) can be randomly selected from a predefined set of filter sets.

Additionally, in some implementations, the computing system can receive as the output of the machine-learned object recognition model a plurality of semantic labels that respectively describe the plurality of objects recognized in the plurality of image frames. The computing system can arrange the two or more of the plurality of image crops 416 to generate the storyboard by selecting the two or more of the plurality of image crops 416 based at least in part on the plurality of semantic labels.

In some implementations, the computing system can apply an audio graphic based at least in part on at least one of the semantic labels that describes at least one object included in at least one of the two or more of the plurality of image crops 416. For example, in some implementations the semantic label can be an object category (e.g., car, person, etc.), and the audio graphic could be indicative of an action (e.g., "vroom" by a car) or a spoken word (e.g., a dialog bubble next to a person's face that has been labeled as speaking). As another example, in some implementations, the computing system can apply a plurality of semantic labels that describe the content of the plurality of image crops 416. For instance, the semantic labels can be configured as captions and/or can narrate the content or "story" of the storyboard.

In some implementations, the computing system can detect sounds from an audio track of the video and utilize the detected sounds to select audio graphics for application to at least one of the plurality of image crops 416. For instance, in response to detecting the sound of applause in the audio track of the video, the computing system can apply an audio graphic such as "clap clap."

As another example, the computing system can select two or more of the plurality of image crops 416 that depict a same object in motion. For example, if two or more image crops 416 show an object such as, for example, a children's toy vehicle in motion, selecting two or more image crops 416 for inclusion in the storyboard can result in the storyboard providing a visual effect showing the object in motion over a number of panels, which can have the effect of "telling" the story.

In some implementations, a one or more machine-learned models can be configured to perform one or more of the above operations. For example, in some implementations, a machine-learned model can be configured to generate the image crops 416, at (408), without recognizing any objects and/or generating any bounding shapes 414. For instance, in some implementations, a machine-learned selection-and-placement model can be trained to receive the summary frame set, and, in response, generate the image crops 416. In some implementations, a machine-learned selection-and-placement model can be used instead of the object recognition and/or motion-detection model described above. For instance, the machine-learned selection-and-placement model can be trained to select the images for cropping, generate the image crops 416, and/or arrange the image crops 416 to form the storyboard. In some implementations, the machine-learned selection-and-placement model can be trained using a training set of summary frames and a training set of image crops. In other embodiments, the machine-learned selection-and-placement model can be trained using a training set of image collections and a training set of storyboards. In some implementations, multiple machine-learned models can work together to perform some or all of the above operations.

Figure 5:
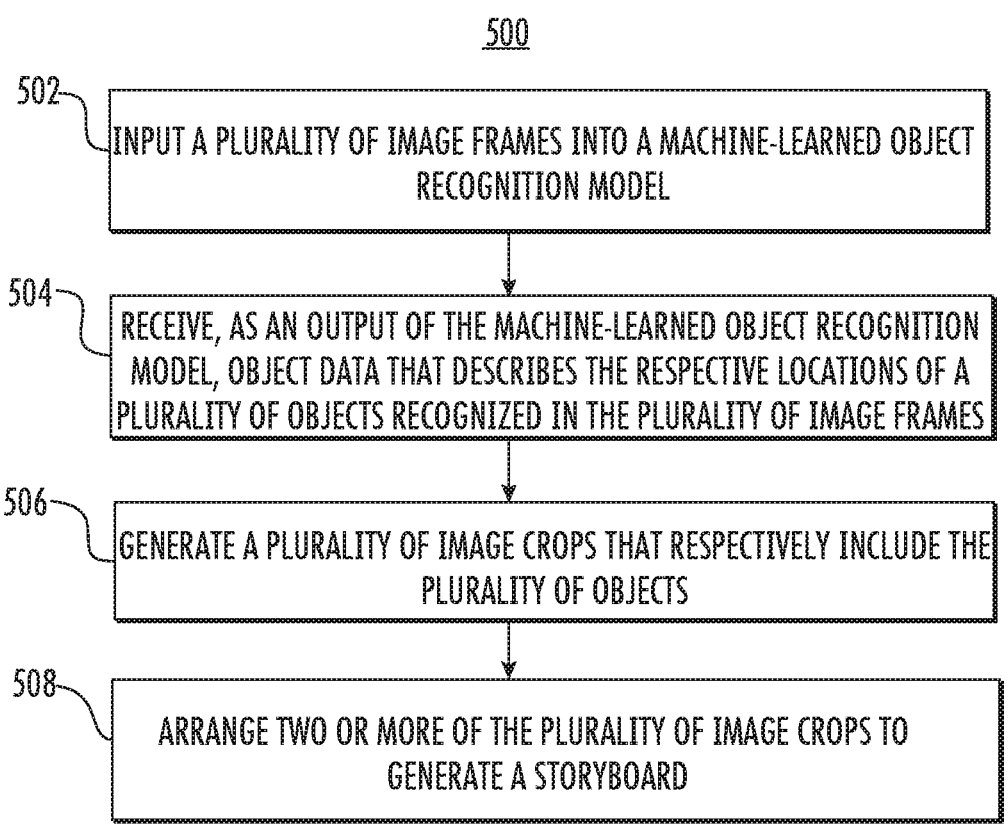
FIG. 5 depicts a flow chart diagram of an example method for generating storyboards according to example aspects of the present disclosure.

FIG. 5 depicts flow chart diagrams of an example method 500 according to example embodiments of the present disclosure. Although FIG. 5 depict steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

Referring to FIG. 5, in some embodiments, the method 500 can include, at (502), inputting a plurality of image frames into a machine-learned object recognition model. The machine-learned object recognition model can be trained to receive a plurality of image frames and output object data that describes the respective locations of a plurality of objects recognized in the plurality of image frames.

At (504), the method 500 can include receiving as an output of the machine-learned object recognition model, object data that describes the respective locations of a plurality of objects recognized in the plurality of image frames. For example, the computing system can receive, as an output of the machine-learned object recognition model, object data that includes a plurality of bounding shapes that describe the respective locations of the plurality of objects (e.g., people, faces, vehicles etc.) recognized in the plurality of image frames.

At (506), the method 500 can include generating a plurality of image crops that respectively include the plurality of objects. For example, for each bounding shape around an object, the computing system can add a certain margin (e.g., 20 pixels, 10% of the bounding shape height/width, or some other margin) around the perimeter of such bounding shape 414 and then extract (e.g., by cropping) the bounding shape plus outer margin. In other implementations, the bounding boxes are simply extracted without any margin being added. One or more image crops can be extracted for each image frame for which one or more objects were detected.

At (508), the method 500 can include arranging two or more of the plurality of image crops to generate a storyboard. Each panel of a storyboard template can have a respective panel aspect ratio, and two or more of the plurality of image crops can be selected for insertion into the storyboard template based at least in part on a comparison of aspect ratios. For example, the computing system can compare a respective crop aspect ratio associated with at least two or more image crops with the respective panel aspect ratio associated with at least two of the panels. Stated differently, the computing system can attempt to match image crops to storyboard panels based on a degree of matching between their corresponding aspect ratios.

In other implementations, a computer-implemented method of processing a video file that includes a plurality of image frames can include selecting a number of image frames from the plurality of image frames. For example, the number of image frames can be a predetermined number of image frames. The method can include selecting an image layout (e.g., a storyboard template) from a plurality of pre-stored image layouts. Each image layout can include a number of image placeholders (e.g., storyboard panels) corresponding to the number of image frames. The method can include detecting, using a machine learned object detection model, a location of an object in each of the number of image frames. For example, the machine learned object detection model can be configured to output one or more bounding shapes identifying the location(s) of the object(s). The method can include cropping each key image frame based on the detected location of the respective object within the image frame. The method can include combining the plurality of cropped image frames with the selected image layout to generate an output image (e.g., storyboard), by inserting one of the plurality of cropped image frames into each of the image placeholders (e.g., storyboard panels) in the selected image layout. The method can include outputting the generated output image.

In some implementations, selecting the number of image frames can include selecting at least one image frame based on one of more of an elapsed time of the video file, a detected motion in the video file, a detected scene change in the video file or one or more objects detected in the video file. In some implementations, selecting the number of image frames can include discarding a selected image frame and selecting a replacement image frame based on one or more of a detected motion blur, a detected focus blur, a detected overexposure, a detected underexposure in the selected image frame, or a detected similarity of the selected image frame with a previously selected image frame.

In some implementations, detecting the location of an object can include, when a plurality of objects are detected in a selected image frame, selecting one of the plurality of detected objects based on a size or shape of the object, based on an object recognition model, or based on a random selection.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:

inputting, by the one or more computing devices, a plurality of image frames into a machine-learned model;

receiving, by the one or more computing devices, as an output of the machine-learned model, object data that describes respective locations of a plurality of objects recognized in the plurality of image frames;

generating, by the one or more computing devices, a plurality of image crops that respectively include the plurality of objects, each of the plurality of image crops having a respective crop aspect ratio;

obtaining, by the one or more computing devices, a storyboard template that comprises a number of panels, each panel having a respective panel aspect ratio, and wherein the respective panel aspect ratios of at least two of the panels are different from each other; and arranging, by the one or more computing devices, two or more of the plurality of image crops in the storyboard template based at least in part on a comparison of the respective crop aspect ratios associated with the two of more of the plurality of image crops to the respective panel aspect ratios associated with at least two of the panels to generate a storyboard.

2. The computer-implemented method of claim 1, further comprising:

providing, by the one or more computing devices, the storyboard for display to a user.

3. The computer-implemented method of claim 1, wherein:

the one or more computing devices consist of a smartphone; and the storyboard has a storyboard aspect ratio that matches a screen aspect ratio associated with a display screen of the smartphone.

4. The computer-implemented method of claim 1, further comprising:

applying, by the one or more computing devices, a stylization effect to the two or more image crops arranged to form the storyboard.

5. The computer implemented method of claim 1, further comprising, prior to said inputting:

receiving, by the one or more computing devices, a video; and before inputting, by the one or more computing devices, the plurality of image frames into the machine-learned model, selecting, by the one or more computing devices, the plurality of image frames from the video to form a summary frame set that summarizes the video.

6. The computer-implemented method of claim 5, further comprising:

dividing, by the one or more computing devices, the video into a plurality of video segments;

wherein selecting, by the one or more computing devices, the plurality of image frames from the video comprises selecting at least one image frame from each of the plurality of video segments to form a summary frame set that summarizes the video.

7. The computer-implemented method of claim 6, wherein dividing, by the one or more computing devices, the video into the plurality of video segments comprises one of:

dividing, by the one or more computing devices, the video into the plurality of video segments of equal length;

dividing, by the one or more computing devices, the video into the plurality of video segments based at least in part on motion detected within the video;

dividing, by the one or more computing devices, the video into the plurality of video segments based at least in part on scene changes detected within the video; and dividing, by the one or more computing devices, the video into the plurality of video segments based at least in part on objects detected within the video.

8. The computer-implemented method of claim 1, wherein the plurality of image frames comprise a plurality of keyframes from an encoded video.

9. The computer-implemented method of claim 5, wherein selecting, by the one or more computing devices, the plurality of image frames from the video comprises one of:

selecting, by the one or more computing devices, the plurality of image frames from the video based at least in part on motion detected within the video;

selecting, by the one or more computing devices, the plurality of image frames from the video based at least in part on scene changes detected within the video;

selecting, by the one or more computing devices, the plurality of image frames from the video based at least in part on objects detected within the video; and selecting, by the one or more computing devices, the plurality of image frames from the video based at least in part on eliminating similar image frames.

10. The computer-implemented method of claim 1, wherein:

receiving, by the one or more computing devices, the object data comprises receiving, by the one or more computing devices, a plurality of bounding shapes that describe respective locations of the plurality of objects recognized in the plurality of image frames; and generating, by the one or more computing devices, the plurality of image crops comprises generating, by the one or more computing devices, the plurality of image crops based at least in part on the plurality of bounding shapes.

11. The computer-implemented method of claim 1, wherein arranging, by the one or more computing devices, the two or more of the plurality of image crops to generate the storyboard comprises:

arranging, by the one or more computing devices, the two or more of the plurality of image crops according to a chronological order.

12. The computer-implemented method of claim 1, wherein:

receiving, by the one or more computing devices, as the output of the machine-learned model, object data comprises receiving, by the one or more computing devices, as the output of the machine-learned model, a plurality of semantic labels that respectively describe the plurality of objects recognized in the plurality of image frames; and arranging, by the one or more computing devices, the two or more of the plurality of image crops to generate the storyboard comprises selecting, by the one or more computing devices, the two or more of the plurality of image crops based at least in part on the plurality of semantic labels.

13. The computer-implemented method of claim 12, further comprising:

applying, by the one or more computing devices, an audio graphic based at least in part on at least one of the semantic labels that describes at least one object included in at least one of the two or more of the plurality of image crops.

14. The computer-implemented method of claim 1, wherein arranging, by the one or more computing devices, the two or more of the plurality of image crops to generate the storyboard comprises:

selecting, by the one or more computing devices, the two or more of the plurality of image crops that depict a same object in motion.

15. A computer-implemented method of processing a video file, the video file comprising a plurality of image frames, the method comprising:

selecting, by a processor, from the plurality of image frames, a number of image frames;

selecting, by the processor, an image layout from a plurality of pre-stored image layouts, each image layout comprising a number of image placeholders corresponding to the number of image frames, each image placeholder having a respective placeholder aspect ratio, and wherein the respective placeholder aspect ratio of at least two of the number of image placeholders are different from each other;

detecting, by the processor, using a machine learned object detection model, a location of an object in each of the number of image frames;

cropping, by the processor, each key image frame based on the detected location of the respective object within the image frame to produce a plurality of cropped image frames, each of the plurality of cropped image frames having a respective crop aspect ratio;

combining, by the processor, the plurality of cropped image frames with the selected image layout to generate an output image, by inserting respective ones of the plurality of cropped image frames into respective ones of the image placeholders in the selected image layout, wherein the respective ones of the plurality of cropped image frames are matched with the respective ones of the image placeholders based at least in part on a comparison of the respective crop aspect ratios with the respective placeholder aspect ratios; and outputting, by the processor for display, the generated output image.

16. The method of claim 15, wherein the selecting the number of image frames comprises selecting at least one image frame based on one of more of an elapsed time of the video file, a detected motion in the video file, a detected scene change in the video file or one or more objects detected in the video file.

17. The method of claim 15, wherein the selecting the number of image frames comprises discarding a selected image frame and selecting a replacement image frame based on one or more of a detected motion blur, a detected focus blur, a detected overexposure, a detected underexposure in the selected image frame, or a detected similarity of the selected image frame with a previously selected image frame.

18. The method of claim 15, wherein detecting the location of an object comprises, when a plurality of objects are detected in a selected image frame:

selecting one of the plurality of detected objects based on a size or shape of the object, based on an object recognition model or based on a random selection.

19. A computer system, comprising:

one or more processors; and one or more non-transitory computer-readable media that store instructions that, when executed by the one or more processors, cause the computer system to perform operations, the operations comprising:

selecting a plurality of image frames from a video;

inputting the plurality of image frames into a machine-learned model;

receiving, as an output of the machine-learned model, a plurality of image crops, each of the plurality of image crops having a respective crop aspect ratio;

obtaining a storyboard template that comprises a number of panels, each panel having a respective panel aspect ratio, and wherein the respective aspect ratios of at least two of the panels are different from each other;

arranging two or more of the plurality of image crops in the storyboard template based at least in part on a comparison of the respective crop aspect ratios of the two of more of the plurality of image crops to the respective panel aspect ratios of at least two of the panels to generate a storyboard; and providing the storyboard for display to a user.

\* \* \* \* \*